UNITED STATES PATENT OFFICE.

WILLIAM D. RENNIE, OF HACKENSACK, NEW JERSEY, ASSIGNOR TO UNIVERSAL ORE REDUCTION COMPANY, OF PHOENIX, ARIZONA TERRITORY, A CORPORATION OF ARIZONA TERRITORY.

MIXTURE OR COMPOSITION FOR USE IN THE ART OF EXTRACTING THE PRECIOUS METALS, GOLD AND SILVER, FROM THEIR NATIVE ORES.

989,803.   Specification of Letters Patent.   Patented Apr. 18, 1911.

No Drawing.   Application filed April 19, 1910. Serial No. 556,362.

*To all whom it may concern:*

Be it known that I, WILLIAM D. RENNIE, a citizen of the United States, and resident of Hackensack, county of Bergen, and State of New Jersey, have made a new and useful invention in mixtures or compositions for use in the art of extracting the precious metals, gold and silver, from their native ores, of which the following is a specification.

My novel mixture or composition embraces water, the powdered ore of the metal, as gold or silver, fluor-spar, and a bromin salt, such as sodium bromid or bromid of potassium when combined preferably in the following proportions: 2000 pounds of water; 2000 pounds powdered ore; 300 pounds fluor-spar and 15 pounds of either of the aforesaid bromin salts. This composition is prepared as follows:—2000 pounds of water is placed in an electrolytic cell operatively connected with a source of electrical energy having the proper potential, dependent upon the nature of the ore to be treated, and then 2000 pounds of the powdered ore are thoroughly intermixed therewith. At the start 100 pounds of fluor-spar and 5 pounds of the bromin salt are added to this solution, and at the end of two hours a second 100 pounds of fluor-spar and 5 pounds of bromin salt are added; at the end of four hours the remaining 100 pounds of fluor-spar and 5 pounds of bromin salt are added and the process is continued for an additional two hours, or a total of six hours. While this compounding of the ingredients is proceeding the liquid is agitated continuously, or is preferably caused to ascend under the influence of compressed air or steam and allowed to descend by gravity between the anode and cathode plates, so that the current is permitted to act practically upon all parts thereof and upon the powdered metal and fluor-spar carried thereby. By mixing a powder of the ore to be treated with the described proportions of fluor-spar and a bromin salt and passing them as a mixture, with water, between the electrodes of an electrolytic cell I cause to be made a deposit of the precious metal being treated upon the cathode, all of the extraction and precipitation taking place at one time and in one operation, under the influence of the current and the heat from the steam. As the current passes through this mixture at approximately the temperature of steam, usually about 210° when forced through the liquid, such temperature changes the calcium fluorid into ferric fluorid from the iron in the ore and also converts the bromin salt into ferric bromid which in turn acting upon the metals in the ore makes the extraction and deposition on the cathode.

I do not limit my invention to the especial elements enumerated; nor to the proportions thereof; nor to the time and manner of applying the same, as naturally the quality of the ores to be treated may vary the conditions. For renewal, that is to say, for further use, or for a second and succeeding batches of the powdered ore, one has only to add a like amount of the ore and 45 pounds of fluor-spar and 1½ pounds of the bromin salt at the start and like proportions of the fluor-spar and salt at the end of two and four hours, as before, and this process, with such renewals, may be kept up indefinitely, dependent upon the amount of ore to be treated.

I make no claim hereinafter to the process of separating the precious metal, such as gold or silver, from their ores by subjecting a composition composed of the powdered ore of the metal while being treated to the action of an electrical current and of adding successively proportional parts of the described salts for the purpose of effecting the result sought, as the process advances, as this feature constitutes broadly the subject matter in part of another application filed by me in the United States Patent Office of even date herewith, bearing Serial No. 556,361 and known as Case A.

Having thus described my invention what I claim and desire to secure by Letters Patent of the United States is—

1. A mixture or composition for use in extracting gold and silver from their ores by an electrolytic process, consisting of water, a powder of the ore, fluor-spar and a bromin salt mixed in substantially the proportions and in the manner described.

2. A mixture or composition for use in extracting gold and silver from their ores by an electrolytic process, consisting of water 2000 pounds, powdered ore 2000 pounds; fluor-spar 300 pounds and bromin salt 15 pounds, substantially as described.

In testimony whereof I have signed my name to this specification in the presence of two subscribing witnesses.

WILLIAM D. RENNIE.

Witnesses:
BARTON B. WARD,
C. J. KINTNER.